United States Patent [19]

Schiessler et al.

[11] 4,056,534
[45] Nov. 1, 1977

[54] PROCESS FOR PREPARING COPPER PHTHALOCYANINE PIGMENTS OF THE α-MODIFICATION

[75] Inventors: Siegfried Schiessler, Frankfurt am Main; Ernst Spietschka, Oberauroff, Taunus; Hans-Gerd Elinkmann, Frankfurt am Main, all of Germany

[73] Assignee: Hoechst Aktiengesellschaft, Frankfurt am Main, Germany

[21] Appl. No.: 574,759

[22] Filed: May 5, 1975

[30] Foreign Application Priority Data

May 6, 1974 Germany .............................. 2421804

[51] Int. Cl.$^2$ .............................................. C09B 47/04
[52] U.S. Cl. .................................................. 260/314.5
[58] Field of Search ...................................... 260/314.5

[56] References Cited

U.S. PATENT DOCUMENTS

| 2,846,441 | 8/1958  | Muehlbauer et al. | 260/314.5 |
| 3,004,986 | 10/1961 | Kirby et al.      | 260/314.5 |
| 3,014,917 | 12/1961 | Minnich           | 260/314.5 |
| 3,523,030 | 8/1970  | Malin et al.      | 260/314.5 |
| 3,801,591 | 4/1974  | Jackson           | 260/314.5 |

FOREIGN PATENT DOCUMENTS

| 1,187,219 | 2/1965  | Germany        | 260/314.5 |
| 1,136,303 | 9/1962  | Germany        | 260/314.5 |
| 40-4144   | 3/1965  | Japan          | 260/314.5 |
| 45-7661   | 3/1970  | Japan          | 260/314.5 |
| 45-6709   | 3/1970  | Japan          | 260/314.5 |
| 1,096,192 | 12/1967 | United Kingdom | 260/314.5 |
| 600,911   | 4/1948  | United Kingdom | 260/314.5 |
| 703,507   | 2/1954  | United Kingdom | 260/314.5 |

OTHER PUBLICATIONS

Robinson et al., J. Am. Chem. Soc., vol. 74, pp. 6294–6295 (1952).
Karasek et al., J. Am. Chem. Soc., vol. 74, pp. 4716–4717 (1952).
Shigemitsu, Bull. Chem. Soc., Japan, vol. 32, pp. 502–505 (1959).

*Primary Examiner*—Richard L. Raymond
*Attorney, Agent, or Firm*—Curtis, Morris & Safford

[57] ABSTRACT

Highly pure α-copper phthalocyanine is obtained when a product regenerated from α-copper phthalocyanine sulfate by hydrolysis with water is aftertreated in an aqueous medium containing a polar organic non-aromatic compound which is water-soluble or liquid. The aftertreated product has an especially high tinctorial strength, is very easily dispersible and has a very pure reddish-blue shade.

3 Claims, 1 Drawing Figure

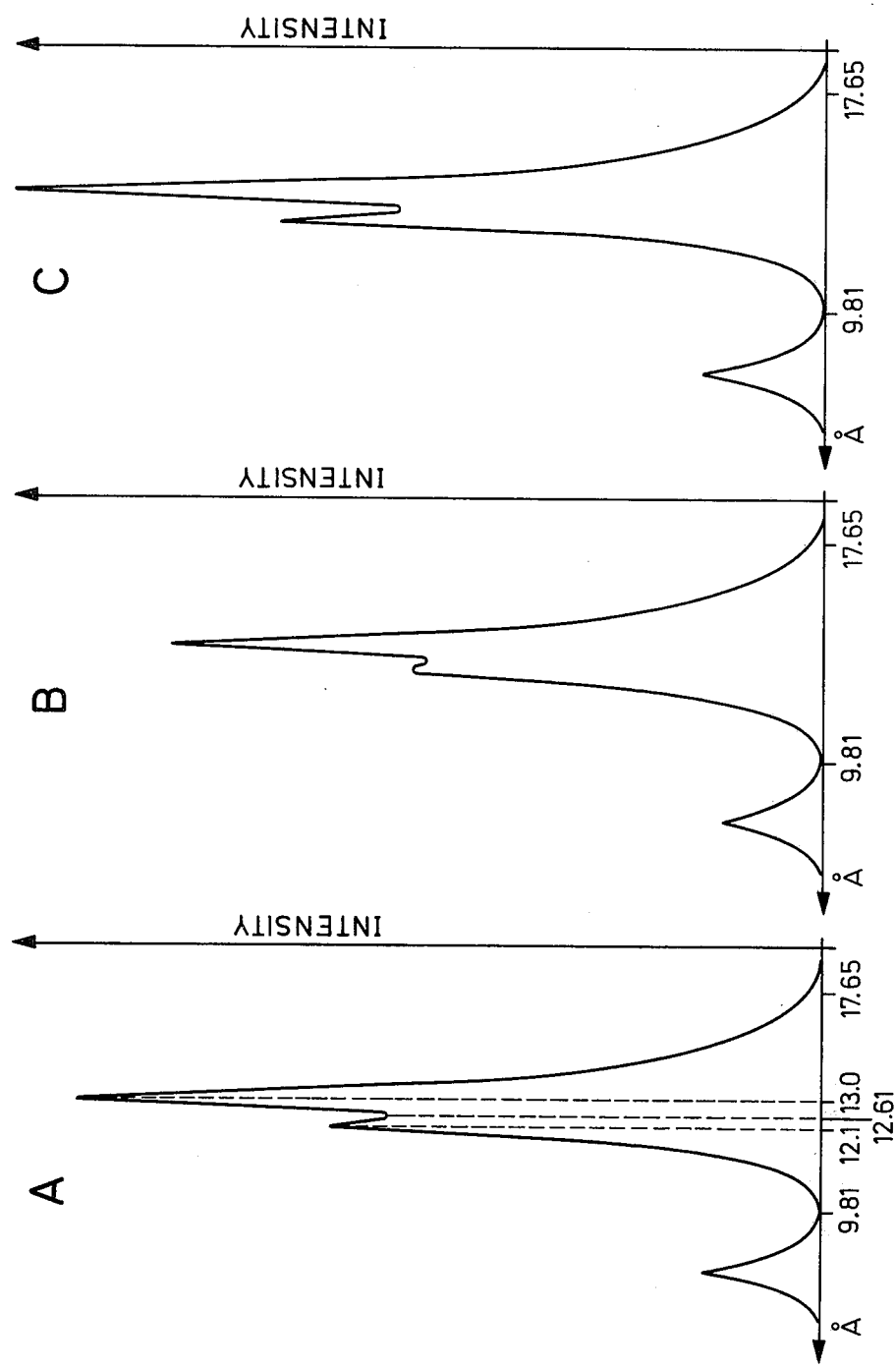

PROCESS FOR PREPARING COPPER PHTHALOCYANINE PIGMENTS OF THE α-MODIFICATION

The present invention relates to a process for preparing copper phthalocyanine pigments of the α-modification which have a high purity and a high tinctorial strength.

Copper phthalocyanine pigments derived from unsubstituted copper phthalocyanine (hereinafter called "CuPc") are not stable in their modification toward a number of organic solvents and therefore have an only limited utility in lacquers and varnishes. Owing to their reddish blue shade, however, they have been gaining great significance for the coloration of plastic materials, especially of polyvinyl chloride, and for the preparation of pigment compositions.

Such a CuPc pigment of the α-modification may be prepared according to known methods either by dissolving CuPc in concentrated sulfuric acid and subsequently introducing this solution into an excess amount of water or by salt grinding CuPc; in both cases, when CuPc of the β-modification is used as a starting product, this is converted into the α-modification.

For use as color pigments, especially for the coloration of plastic materials, for example polyvinyl chloride, extremely high standards as to tinctorial strength and especially dispersibility of the pigments are nowadays set up by industry for economical reasons. This also applies, to a large extent, to the reddish blue CuPc pigments of the α-modification, the crystal modification of which is not stable but which, nevertheless, are very important for the coloration of plastics.

Therefore, German Offenlengungsschrift No. 2,262,911 proposes a process for preparing a pure CuPc pigment of the α-modification, uwhich has a higher tinctorial strength and dispersibility than the known trade products. But for reasons of application techniques, further improvement in tinctorial strength and dispersibility has since been desirable.

It has now been found that a CuPc pigment of the α-modification having an extremely high tinctorial strength and an especially good dispersibility can be obtained by aftertreating an aqueous suspension of an unsubstituted CuPc pigment of the α-modification obtained by dissolution and precipitation of CuPc in sulfuric acid and subsequent fine division in an aqueous medium, with a polar aliphatic, cycloaliphatic or heterocyclic organic compound which contains up to 8 carbon atoms per molecule and is entirely or partly soluble in water or is liquid under the conditions of the aftertreatment, in othe homogeneous or heterogenous aqueous-organic medium thus obtained, preferably at an elevated temperature.

The CuPc pigment used for the aftertreatment with such an organic compound is preferably obtained according to the following method of dissolution, precipitation and fine division:

CuPc is converted in 70 – 100% sulfuric acid into CuPc sulfate and, when a sulfuric acid of higher concentration is used, the CuPc sulfate solution is diluted with water or a dilute sulfuric acid to reach a sulfuric acid concentration preferably of 75 to 88% by weight. The CuPc salt which is not soluble at this sulfuric acid concentration is then isolated. In a sulfuric acid of lower concentration, for example from 70 to 88%, the CuPc is also converted into the sulfate without being dissolved, and then isolated. This salt is subsequently hydrolyzed, and the resulting CuPc of the α-phase which is suction-filtered and obtained in pure state is finely divided in an aqueous suspension by means of kneading devices, high-speed stirrers having a grinding effect, vibratory mills, ball mills, bead mills or other mills containing the usual grinding bodies, and under the usual conditions.

Among these methods, a method proposed in German Offenlegungsschrift No. 2,262,911 is preferably used. According to this method, a highly concentrated aqueous suspension of CuPc of the α-modification is ground preferably on a vibratory mill or bead mill. The CuPc is purified and finely divided, for example by dissolving crude phthalocyanine in 4 to 10 times the amount of 96 – 100% sulfuric acid, and then diluting this solution with water or dilute sulfuric acid to reach an acid content of 86 – 80%, whereupon the CuPc sulfate precipitates. This CuPc sulfate may, however, also be prepared as mentioned above by introducing CuPc into a preferably 80 – 86% sulfuric acid. The CuPc sulfate is then suction-filtered at room temperature, washed with a small amount of 80 – 86% sulfuric acid and hydrolyzed by introducing it into 4 to 10 times the amount of water, calculated on the dry crude dyestuff. The CuPc thus purified is suction-filtered, washed with water until free of acid and then finely divided in the form of its aqueous filter cake by mechanical means to yield the pigment. The fine division is carried out in an aqueous suspension of the highest possible concentration. The ratio of dyestuff to water ranges from about 1:2 to 1:15, preferably from 1:3 to 1:7.

A particularly advantageous method for dissolution and precipitation is proposed in German Offenlegungsschrift No. 2,262,895. In that process, a CuPc sulfate which is especially easy to filter and has coarse crystals is obtained by introducing CuPc into sulfuric acid of 84 – 88% strength, preferably of 85.5 – 86.5% strength, and then aftertreating the resulting suspension of the CuPc sulfate in an inert gas atmosphere for one to several hours at 60° – 100° C. It is also possible to dissolve CuPc first in sulfuric acid of a higher concentration and then dilute this solution by adding the calculated amount of water or dilute sulfuric acid to reach a sulfuric acid concentration of 84 – 88%, preferably 85.5 – 86.5%, and finally treating it at an elevated temperature. According to that process, the introduction of CuPc into 84 – 88% sulfuric acid also results in the known CuPc sulfate having extremely fine crystals, which is difficult to filter. During the aftertreatment of this CuPc sulfate suspension at 60° – 100° C, the crystals of the sulfate grow into large regular crystals which may reach a size of 1 mm. The so-obtained CuPc sulfate suspension containing the coarse crystals is then suction-filtered; the CuPc sulfate is hydrolyzed in the manner already mentioned. The isolated pure CuPc of the α-modification is subjected in the form of its aqueous filter cake to the mechanical fine division operation mentioned above in a concentrated aqueous suspension.

Another dissolution and precipitation method, which is however not advisable for ecological reason, is the process known as "acid pasting", according to which CuPc is dissolved or suspended in sulfuric acid and then hydrolyzed in a large excess amount of water.

As starting product, only unsubstituted CuPc is generally used in the form of crude or prepurified material. The process is also applicable to copper phthalocyanines containing, in addition to CuPc, very small amounts of a substituted CuPc, the substituents being, for example, halogen atoms, carboxy or sulfo groups.

The CuPc which has been dissolved and precipitated and then finely divided according to one of the above-mentioned methods is then aftertreated in an aqueous suspension, advantageously direct in the aqueous pigment suspension resulting from the fine division, with one of the above-mentioned organic compounds which do not bring about a conversion of the crystal phase under the conditions of the aftertreatment, to convert this CuPc into a particularly valuable CuPc pigment of the α-modification having a high tinctorial strength and a good dispersibility.

The pigment is treated in the aqueous-organic medium at room temperature (15° – 25° C), preferably at elevated temperature, for example from 30° to 80° C. Temperature and reaction time depend on the type of organic additive and on its concentration in the aqueous suspension. In media having a high content of these organic additives, the reaction time is relatively short and the reaction is generally carried out at a lower temperature, whilst in a low-concentrated medium, calculated on the organic additive, a longer reaction time may be required at a relatively high temperature.

The amount of said organic compounds to be added to the aqueous pigment suspension resulting from fine division for conditioning purposes may vary greatly. The amount of organic additives is preferably as high as to assure a final concentration of organic additive in a liquid phase of from 3 to 20%.

Depending on the type and amount of the organic additive, reaction temperature and time have to be such that the tinctorial properties of the pigment treated are optimal, considering the reaction procedure, i.e. bearing in mind that a continuation of the aftertreatment beyond the limit for an optimum pigment quality may cause a deterioration of the pigment quality due to further growth of the particles. An important criterion for such an assessment is provided by an X-ray diffraction spectrum of the pigment (lattice spacing from 9.8 A to 17.65 A); a CuPc pigment showing an X-ray diffraction spectrum, in which the ratio of the relative intensity differences between the maxima at 12.1 and 13.0 A, respectively, and the minimum at 12.6 A has a value of from about 1:10 to 1:4, has an especially high tinctorial strength and a good dispersiblity. In this case, the specific surface ranges from 50 $m^2/g$ to 80 $m^2/g$, preferably from 60 $m^2/g$ to 75 $m^2/g$ (measured according to BET).

Among the polar aliphatic or cycloaliphatic compounds used for the aftertreatment of the dissolved, precipitated and finely divided CuPc, there are mentioned those advantageously containing hydrophilic groups, preferably hydroxy, amino, carbonyl groups, such as carboxylic acid ester, carboxy, carboxylic acid amide groups, or ether-type oxygen bridges (—O—). These compounds may be soluble in water but they may also be sparingly soluble or insoluble in water. Unless soluble in water, they should be in liquid form at the temperature chosen for the aftertreatment.

Aromatic compounds, for example xylene, are not useful since in addition to having a strong effect on crystallization they may also bring about a conversion of phases. Polar water-soluble heterocyclic aromatic compounds, for example pyridine, are also less advantageous than the aliphatic or cycloaliphatic compounds containing hydroxy, carbonyl or oxygen groups.

Polar aliphatic or cycloaliphatic compounds used are, above all, alkanols, cycloalkanols, ketones, aliphatic and cycloaliphatic ethers, glycol ether, alkane-carboxylic acids and derivatives thereof, for example esters, nitriles, amides, lactones or lactams, the term "alkanecarboxylic acids" comprising formic acid. Especially suitable compounds are, for example, methanol, ethanol, isopropanol, isobutanol, the amyl alcohols, acetone, methylethyl-ketone, diethylketone, dioxan, tetrahydrofuran, diisopropyl ether, acetic acid, methyl acetate, ethyl acetate, butyl acetate or amyl acetate, cyclohexanol, ethylene glycol, β-ethoxy-ethanol, formamide, dimethylformamide, acetonitrile, N-methyl-pyrrolidone, hexamethyl phosphoric acid trisamide or tetramethylene sulfone.

Among these aliphatic or cycloaliphatic compounds, those are advantageously selected which, after the reaction is complete, can be separated in a simple manner from the aqueous medium, for example by distillation or steam distillation, prior to or after isolation of the pigment. For this reason, those compounds are especially used for conditioning purposes, which contain not more than 6 carbon atoms per molecule.

The conditioned CuPc pigment may be isolated by filtration or evaporation, preferably by spray-drying. The organic additive may be separated either prior to or after isolation, for example by distillation or steam distillation.

The new CuPc pigment of the α-modification prepared according to the process of the invention and showing a determined fine division as well as a determined X-ray diffraction spectrum has a very high tinctorial strength and a good dispersibility. It is especially suitable for the coloration of plastic materials, in particular of polyvinyl chloride, and for the preparation of dyeing compositions.

From British Patent Specification No. 951,968, it is already known that CuPc of the α-modification obtained by dissolving it in sulfuric acid and hydrolyzing the solution in a large excess of water can be conditioned by adding very small amounts of alcohols preferably containing 5 to 12 carbon atoms per molecule. The products obtained according to that process, however, have a low tinctorial strength and a poor dispersibility in polyvinyl chloride in comparison to those obtained according to the present invention.

Furthermore, it is known from German Pat. No. 1,619,568, that CuPc of the α-modification can be treated in a dry pigment form with polar aliphatic solvents. The products obtained according to that process are inferior to the pigment obtained according to this invention as to tinctorial strength and dispersibility.

In addition, the process disclosed in the above German Patent is not economical since it requires two isolation and drying operations for the pigment and, according to the teaching of said patent, partial conversion of the α-modification into the β-modification is brought about.

Moreover, it is known from U.S. Pat. No. 3,119,706 that an aqueous suspension of CuPc of the α-modification, obtained according to the "acid pasting" method, can be treated in the presence of water-soluble organic liquids capable of being salted out, and upon addition of the amount of salt required for a complete salting out of the organic liquid at an elevated temperature. That process does not yield a pigment which equals that obtained according to the process of the invention nor is it recommendable for ecological reasons owing to a heavy water pollution with salts.

The following Examples illustrate the invention, the parts and percentages being by weight unless stated otherwise.

EXAMPLE 1 a. 32 Parts of unsubstituted crude copper phthalocyanine (95% trade product) were drowned while stirring in 320 parts of 86% sulfuric acid. The resulting suspension of the copper phthalocyanine sulfate was heated to 70° C and stirred for 4 hours at 70° – 80° C in a nitrogen atmosphere, whereupon the copper phthalocyanine sulfate first obtained in the form of finely divided needles was converted into big regular crystals. After having been stirred for 4 hours at 70° – 80° C, the suspension was cooled to 20° – 30° C. The CuPc sulfate was suction-filtered and washed with 80% sulfuric acid. The filter cake of the CuPc sulfate was stirred into 300 parts of water. The mixture was suction-filtered and washed with water until neutral.

60 Parts of a 50% filter cake were obtained. The degree of purity of the CuPc of the α-modification was 99–100%. The total amount of the 50% filter cake obtained upon purification was diluted with 107 parts of water, and after homogenization it was continuously ground in a ball mill provided with stirrer (for example, of the type RM 25, manufacture by Messrs. Netzsch, W. Germany). 167 Parts of an 18% pigment suspension of CuPc of the α-modification were obtained. To this aqueous suspension, 137 parts of isopropanol were added, the mixture was heated to 50° C and stirred for 5 hours at 50° – 55° C. It was then cooled to room temperature and suction-filtered. The material was washed with 100 parts of water, and the aqueous filter cake was dried in vacuo at 60° C. 30 Parts of an unsubstituted CuPc pigment of the α-modification were obtained.

The pigment powder obtained was incorporated in polyvinyl chloride according to known methods to produce colorations which have a substantially higher color intensity and a purer, particularly reddish blue shade than colorations produced with comparable trade pigment dyes. Moreover, the pigments obtained is distinguished by a far better dispersiblity in plastic materials in comparison to known trade products.

The pigment obtained showed the X-ray diffraction spectrum A illustrated in the drawing for the measuring range from 9.8 A to 17.65 A and measured by means of Cuk α-rays. The specific surface of the pigment was 65 m²/g (measured according to BET).

b. When the CuPc suspension resulting from fine division in an aqueous medium was not aftertreated with isopropanol, the pigment obtained after drying showed the X-ray diffraction spectrum B illustrated in the drawing for the measuring range from 9.81 A to 17.65 A and a specific surface of only 37 m²/g (measured according to BET). Compared to the pigment which had been aftertreated with isopropanol, this pigment, when incorporated in polyvinyl chloride, had a poorer tinctorial strength and dispersibility.

When the aftertreatment with isopropanol was carried out not for 5 hours at 50° – 55° C but for 6 hours at 80° – 85° C, the pigment obtained showed an X-ray diffraction spectrum C as illustrated in the drawing and provided upon incorporation in polyvinyl chloride, duller colorations which had a substantially poorer color intensity.

c. When instead of 137 parts of isopropanol, 137 parts of methanol or ethanol were used, a treatment for 5 hours at 50° – 55° C yielded a pigment which was as valuable as that obtained upon treatment with isopropanol according to process (a).

EXAMPLE 2

167 Parts of the aqueous suspension resulting from fine division according to Example 1(a) were added to 133 parts of water and 30 parts of isopropanol. The mixture was then stirred for 8 hours at 80° C. The work-up was carried out as in Example 1(a). The pigment obtained corresponded in its tinctorial properties to that obtained according to Example 1(a) and (c).

EXAMPLE 3

167 Parts of the aqueous suspension resulting from fine division according to Example 1(a) were added to 154 parts of water and 9 parts of isopropanol, and the mixture was stirred for 2 hours at 50° C. The isopropanol was then distilled off with steam. The aqueous suspension was spray-dried. 30 Parts of CuPc pigment of the α-modification were obtained. This pigment was distinguished by an excellent dispersibility and upon incorporation in polyvinyl chloride it provided colorations of high color intensity and a very pure reddish blue shade.

EXAMPLE 4

167 Parts of the aqueous suspension resulting from fine division according to Example 1(a) were added to 148 parts of water and 15 parts of ethyl acetate. The mixture was stirred for 2 hours at 30° C, and the ethyl acetate was then distilled off with steam. Upon having cooled to room temperature the aqueous suspension was suction-filtered, and the water-moist filter cake was dried in vacuo at 60° C. The pigment obtained has excellent tinctorial properties. When the heat treatment was carried out not for 2 hours at 30° C but for 2 hours at 50° C, the pigment obtained had the same quality.

When instead of 148 parts of water and 15 parts of ethyl acetate, 133 parts of water and 30 parts of glacial acetic acid were used, and the treatment was carried out for 2 hours at 50° C, the pigment obtained also had a high tinctorial strength and a good dispersibility.

EXAMPLE 5

167 Parts of the aqueous suspension resulting from fine division according to Example 1(a) were combined with 133 parts of water and 30 parts of acetone. The mixture was stirred for 4 hours at 50° C, the suspension was then cooled to room temperature and suction-filtered. The filter cake was washed with water and dried in vacuo at 60° C. The pigment obtained provided colorations in polyvinyl chloride which had a very high color itensity. A similar pigment was obtained by replacing the 133 parts of water and 30 parts of acetone by 148 parts of water and 15 parts of dioxan and treating the suspension for only 2 hours at 50° C instead of 4 hours.

EXAMPLE 6

167 Parts of the aqueous suspension resulting from fine division according to Example 1(a) were combined with 148 parts of water and 15 parts of dimethylformamide. The mixture was stirred for 2 hours at 50° C, the suspension was cooled to room temperature and suction-filtered. The filter cake was washed with water and dried in vacuo at 60° C.

When the 15 parts of dimethylformamide were replaced by 15 parts of N-methyl-pyrrolidone, the pigment obtained had the same tinctorial quality.

EXAMPLE 7

167 Parts of the aqueous suspension resulting from fine division according to Example 1(a) were combined with 148 parts of water and 15 parts of pyridine. The mixture was stirred for 2 hours at 50° C, cooled to room temperature and suction-filtered. The filter cake was washed with water and dried in vacuo at 60° C. The pigment obtained was distinguished by a higher tinctorial strength and a better dispersibility in polyvinyl chloride than the comparable trade products.

EXAMPLE 8

33.5 Parts of unsubstituted crude CuPc (in form of a 90% trade product) were dissolved while stirring in 320 parts of 96% sulfuric acid. The solution was heated to 70° – 80° C, and while maintaining this temperature it was diluted within 30 minutes by slowly adding 64 parts of water to reach a sulfuric acid concentration of 80%. After having been cooled to room temperature, the precipitated CuPc sulfate was isolated by filtration and washed with 80% sulfuric acid. The filter cake was then drowned in 500 parts of water at room temperature, filtered and washed with water until neutral. 120 Parts of moist 25% filter cake were obtained. The degree of purity of this CuPc of the α-modification was 99 – 100%.

The total amount of the 25% filter cake obtained upon purification was stirred into 47 parts of water and then continuously ground in a bead mill. 167 Parts of an 18% pigment suspension of CuPc of the α-modification were obtained. This reaction of dissolving and precipitating the crude CuPc to yield the pure CuPc of the α-modification and the subsequent fine grinding operation corresponded to the method disclosed in German Offenlegungsschrift No. 2,262,911.

When this suspension was aftertreated with isopropanol as in Example 1(a), the pigment obtained also had a high tinctorial strength and a very good dispersibility in plastic materials. The same results were obtained by carrying out the fine division not be grinding in a bead mill but in a continuous vibratory mill.

We claim:

1. A process for the preparation of highly pure, unsubstituted α-copperphthalocyanine which comprises: forming an aqueous suspension of α-copperphthalocyanine by regenerating α-copperphthalocyanine from its sulfate; finely distributing said α-copperphthalocyanine in said aqueous suspension; adding to said aqueous suspension a polar compound having up to 8 carbon atoms which is water-soluble or liquid under the aftertreating conditions recited below, said polar compound being an alcohol, a ketone, an ether, a carboxylic acid or a functional derivative of a carboxylic acid selected from the group consisting of esters, nitriles, amides, lactones and lactams and further being aliphatic, cycloaliphatic or saturated heterocyclic compound containing one or two identical or different hetero atoms selected from oxygen, sulfur and nitrogen; finely distributing said α-copperphthalocyanine in said aqueous medium containing said polar compound at a temperature of 15° to 80° C and continuing said fine distribution until the difference in the intensity between the maxima at 12.1 and 13 A and the minimum at 12.6 A in the Xray diagram of the product is from 1:10 to 10:4.

2. A process as defined in claim 1, wherein said polar compound is an alkanol, a dialkyl ketone, a dialkyl ether, a cyclic mono- or diether, a mono- or dialkyl glycol ether, cyclohexanol, an alkanoic acid, an alkyl alkanoate, an amide, mono- or dialkyl amide of an alkanoic acid or an alkyl nitrile.

3. α-Copper phthalocyanine obtained by the process defined in claim 1.

* * * * *